United States Patent
Yamamoto et al.

(10) Patent No.: US 7,961,409 B2
(45) Date of Patent: Jun. 14, 2011

(54) ZOOM LENS SYSTEM, OPTICAL APPARATUS, AND METHOD FOR ZOOMING

(75) Inventors: Hiroshi Yamamoto, Kawasaki (JP); Tomoki Ito, Kawasaki (JP); Takeshi Suzuki, Yokohama (JP)

(73) Assignee: Nikon Corporation, Tokyo (JP)

(*) Notice: Subject to any disclaimer, the term of this patent is extended or adjusted under 35 U.S.C. 154(b) by 78 days.

(21) Appl. No.: 12/139,464

(22) Filed: Jun. 14, 2008

(65) Prior Publication Data

US 2009/0002841 A1 Jan. 1, 2009

(30) Foreign Application Priority Data

Jun. 29, 2007 (JP) ................. 2007-173146

(51) Int. Cl.
*G02B 9/12* (2006.01)
(52) U.S. Cl. .................................... 359/784
(58) Field of Classification Search ............ 359/695, 359/784
See application file for complete search history.

(56) References Cited

U.S. PATENT DOCUMENTS

| | | | |
|---|---|---|---|
| 5,835,272 A | 11/1998 | Kodama |
| 6,320,698 B1 | 11/2001 | Suzuki |
| 6,618,198 B1 | 9/2003 | Endo |
| 7,102,829 B2 | 9/2006 | Nishimura |
| 7,126,759 B2 | 10/2006 | Sensui |
| 7,196,852 B2 | 3/2007 | Nishimura |
| 7,382,550 B2 | 6/2008 | Nishimura |
| 7,443,604 B2 | 10/2008 | Nishimura |
| 2005/0063069 A1 | 3/2005 | Nishimura |
| 2007/0070517 A1 | 3/2007 | Harada |

FOREIGN PATENT DOCUMENTS

| | | |
|---|---|---|
| JP | 2-136812 | 5/1990 |
| JP | 7-152002 | 6/1995 |
| JP | 10-039210 | 2/1998 |
| JP | 11-174329 | 7/1999 |
| JP | 2004-212541 | * 7/2004 |
| JP | 2004-212541 A | 7/2004 |
| JP | 2005-049843 | 2/2005 |
| JP | 2005-92056 A | 4/2005 |
| JP | 2005-107036 | 4/2005 |
| JP | 2006-098961 | 4/2006 |
| JP | 2006098961 | * 4/2006 |
| JP | 2007-078834 | 3/2007 |
| JP | 2007-093976 | 4/2007 |
| WO | WO 2008/010563 | 1/2008 |

OTHER PUBLICATIONS

Extended European Search Report and Opinion from European Patent Appln. No. 08252182.

* cited by examiner

*Primary Examiner* — Joseph Martinez
(74) *Attorney, Agent, or Firm* — Miles & Stockbridge P.C.

(57) ABSTRACT

Providing a zoom lens system having excellent optical performance, an optical apparatus, and a method for zooming the zoom lens system. The zoom lens system includes, in order from an object, a first lens group G1 having negative refractive power, a second lens group G2 having positive refractive power, and a third lens group G3 having negative refractive power. Upon zooming from a wide-angle end state W to a telephoto end state T, each distance between adjacent lens groups is varied. The second lens group G2 includes, in order from the object, a front group G2a having positive refractive power, and a rear group G2b. Focusing on the object is carried out by moving the front group G2a along an optical axis. Given conditional expressions are satisfied.

23 Claims, 13 Drawing Sheets

ZOOM LENS SYSTEM, OPTICAL APPARATUS, AND METHOD FOR ZOOMING

The disclosure of the following priority application is herein incorporated by reference:

Japanese Patent Application No. 2007-173146 filed on Jun. 29, 2007.

BACKGROUND OF THE INVENTION

1. Field of the Invention

The present invention relates to a zoom lens system, an optical apparatus, and a method for zooming the zoom lens system.

2. Related Background Art

There has been proposed a zoom lens system suitable for a film camera, an electronic still camera, a video camera, and the like such as Japanese Patent Application Laid-Open No. 2005-92056.

However, such a conventional zoom lens system has not sufficiently accomplished to have high optical performance.

SUMMARY OF THE INVENTION

According to a first aspect of the present invention, there is provided a zoom lens system comprising, in order from an object: a first lens group having negative refractive power; a second lens group having positive refractive power; and a third lens group having negative refractive power, upon zooming from a wide-angle end state to a telephoto end state, each distance between adjacent lens groups being varied, the second lens group including, in order from the object, a front group having positive refractive power, and a rear group, upon focusing on the object, the front group being moved along an optical axis, and the following conditional expressions (1) and (2) being satisfied:

$$1.20 < f2/fw < 1.90 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state.

In the first aspect of the present invention, it is preferable that the system further includes a fourth lens group having positive refractive power, and upon zooming from the wide-angle end state to the telephoto end state, a distance between the second lens group and the third lens group increases, and a distance between the third lens group and the fourth lens group decreases.

In the first aspect of the present invention, it is preferable that the fourth lens group includes a cemented lens.

In the first aspect of the present invention, it is preferable that the fourth lens group consists of, in order from an image, a cemented lens constructed by a negative lens cemented with a positive lens, and a single lens having positive refractive power.

In the first aspect of the present invention, it is preferable that the third lens group can be shifted in a direction substantially perpendicular to the optical axis.

In the first aspect of the present invention, it is preferable that at least a portion of the third lens group can be shifted in a direction substantially perpendicular to the optical axis.

In the first aspect of the present invention, it is preferable that at least a portion of the second lens group can be shifted in a direction substantially perpendicular to the optical axis.

In the first aspect of the present invention, it is preferable that the system further includes an aperture stop, and the aperture stop is moved together with the third lens group upon zooming from the wide-angle end state to the telephoto end state.

In the first aspect of the present invention, it is preferable that the third lens group includes a cemented lens.

In the first aspect of the present invention, it is preferable that the second lens group includes at least one cemented lens.

In the first aspect of the present invention, it is preferable that the front group of the second lens group consists of only a cemented lens.

In the first aspect of the present invention, it is preferable that upon zooming from the wide-angle end state to the telephoto end state, the first lens group is moved at first to an image side and then to the object side.

In the first aspect of the present invention, it is preferable that the following conditional expression (3) is satisfied:

$$-0.60 < (d1w - d1t)/Y\max < 0.17$$

where $d1w$ denotes a distance between the most object side lens surface of the zoom lens system and an image plane in the wide-angle end state, $d1t$ denotes a distance between the most object side lens surface of the zoom lens system and the image plane in the telephoto end state, and Ymax denoted the maximum image height.

In the first aspect of the present invention, it is preferable that the most image side lens surface of the zoom lens system is a convex surface facing the image.

According to a second aspect of the present invention, there is provided an optical apparatus equipped with the zoom lens system according to the first aspect.

According to a third aspect of the present invention, there is provided a method for zooming a zoom lens system comprising steps of: providing the zoom lens system comprising, in order from an object, a first lens group having negative refractive power, a second lens group having positive refractive power, and a third lens group having negative refractive power, the second lens group including, in order from the object, a front group having positive refractive power, and a rear group, the front group being moved along an optical axis upon focusing on the object, the following conditional expressions (1) and (2) being satisfied:

$$1.20 < f2/fw < 1.90 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state; and varying each distance between adjacent lens groups upon zooming from a wide-angle end state to a telephoto end state.

In the third aspect of the present invention, it is preferable that the method further includes a step of: shifting at least a portion of the third lens group in a direction substantially perpendicular to the optical axis.

In the third aspect of the present invention, it is preferable that the method further includes a step of: providing the third lens group that includes a cemented lens.

In the third aspect of the present invention, it is preferable that the method further includes a step of: providing the second lens group that includes at least one cemented lens.

The present invention makes it possible to provide a zoom lens system having excellent optical performance, an optical apparatus, and a method for zooming the zoom lens system.

BRIEF DESCRIPTION OF THE DRAWINGS

FIGS. 2A, 2B and 2C are graphs showing various aberrations of the zoom lens system according to Example 1 in the wide-angle end state, in which FIG. 2A shows various aberrations focusing on infinity, FIG. 2B shows coma upon performing vibration reduction with respect to a rotational camera shake of 0.7 degrees, and FIG. 2C shows various aberrations upon focusing on a close object at imaging magnification β=−0.033.

FIGS. 3A and 3B are graphs showing various aberrations of the zoom lens system according to Example 1 in an intermediate focal length state, in which FIG. 3A shows upon focusing on infinity, and FIG. 3B shows upon focusing on a close object at imaging magnification β=−0.033.

FIGS. 4A, 4B and 4C are graphs showing various aberrations of the zoom lens system according to Example 1 in a telephoto end state, in which FIG. 4A shows various aberrations focusing on infinity, FIG. 4B shows coma upon performing vibration reduction with respect to a rotational camera shake of 0.4 degrees, and FIG. 4C shows various aberrations upon focusing on a close object at imaging magnification β=−0.033.

FIGS. 6A, 6B and 6C are graphs showing aberrations of the zoom lens system according to Example 2 in the wide-angle end state, in which FIG. 6A shows various aberrations focusing on infinity, FIG. 6B shows coma upon performing vibration reduction with respect to a rotational camera shake of 0.7 degrees, and FIG. 6C shows various aberrations upon focusing on a close object at imaging magnification β=−0.033.

FIGS. 7A and 7B are graphs showing various aberrations of the zoom lens system according to Example 2 in an intermediate focal length state, in which FIG. 7A shows upon focusing on infinity, and FIG. 7B shows upon focusing on a close object at imaging magnification β=−0.033.

FIGS. 8A, 8B and 8C are graphs showing various aberrations of the zoom lens system according to Example 2 in a telephoto end state, in which FIG. 8A shows various aberrations focusing on infinity, FIG. 8B shows coma upon performing vibration reduction with respect to a rotational camera shake of 0.4 degrees, and FIG. 8C shows various aberrations upon focusing on a close object at imaging magnification β=−0.033.

FIGS. 10A, 10B and 10C are graphs showing aberrations of the zoom lens system according to Example 3 in the wide-angle end state, in which FIG. 10A shows various aberrations focusing on infinity, FIG. 10B shows coma upon performing vibration reduction with respect to a rotational camera shake of 0.7 degrees, and FIG. 10C shows various aberrations upon focusing on a close object at imaging magnification β=−0.033.

FIGS. 11A and 11B are graphs showing various aberrations of the zoom lens system according to Example 3 in an intermediate focal length state, in which FIG. 11A shows upon focusing on infinity, and FIG. 11B shows upon focusing on a close object at imaging magnification β=−0.033.

FIGS. 12A, 12B and 12C are graphs showing various aberrations of the zoom lens system according to Example 3 in a telephoto end state, in which FIG. 12A shows various aberrations focusing on infinity, FIG. 12B shows coma upon performing vibration reduction with respect to a rotational camera shake of 0.4 degrees, and FIG. 12C shows various aberrations upon focusing on a close object at imaging magnification β=−0.033.

DESCRIPTION OF THE MOST PREFERRED EMBODIMENT

Figure 1:
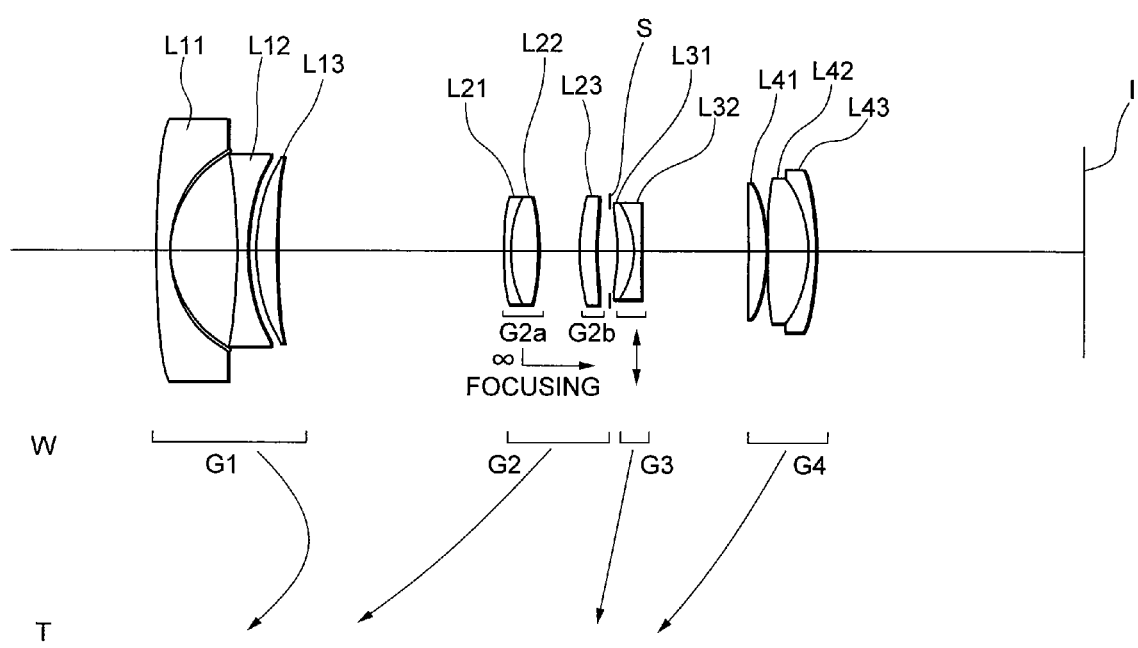
FIG. 1 is a sectional view showing a lens configuration of a zoom lens system according to Example 1 of the present embodiment in a wide-angle end state.

A zoom lens system, an optical apparatus, and a method for zooming the zoom lens system according to the present embodiment are explained below.

The zoom lens system according to the present embodiment comprises, in order from an object, a first lens group having negative refractive power, a second lens group having positive refractive power, and a third lens group having negative refractive power. Upon zooming from a wide-angle end state to a telephoto end state, each distance between adjacent lens groups is varied. The second lens group includes, in order from the object, a front group having positive refractive power, and a rear group. Upon focusing on the object, the front group is moved along an optical axis of the zoom lens system. The following conditional expressions (1) and (2) are satisfied:

$$1.20 < f2/fw < 1.90 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state.

Conditional expression (1) defines refractive power of the second lens group. In a zoom lens system according to the present embodiment, with satisfying conditional expression (1), it becomes possible to accomplish excellent optical performance with effectively securing a designated zoom ratio. Moreover, it becomes possible to accomplish excellent optical performance upon carrying out vibration reduction with this lens configuration.

When the ratio f2/fw is equal to or falls below the lower limit of conditional expression (1), refractive power of the second lens group becomes too large, so that coma becomes worse. Moreover, decentered aberration such as coma or astigmatism upon carrying out vibration reduction becomes worse.

In order to secure the effect of the present embodiment, it is preferable to set the lower limit of conditional expression (1) to 1.30.

On the other hand, when the ratio f2/fw is equal to or exceeds the upper limit of conditional expression (1), refractive power of the second lens group becomes too small, so that a moving amount of each lens group upon zooming increases. Accordingly, it becomes difficult to correct curvature of field and chromatic aberration upon zooming from the wide-angle end state to the telephoto end state.

In order to secure the effect of the present embodiment, it is preferable to set the upper limit of conditional expression (1) to 1.80.

Conditional expression (2) defines refractive power of the third lens group. In a zoom lens system according to the present embodiment, with satisfying conditional expression (2), it becomes possible to accomplish excellent optical performance with effectively securing a designated zoom ratio. Moreover, it becomes possible to accomplish excellent optical performance upon carrying out vibration reduction with this lens configuration.

When the ratio f3/fw is equal to or falls below the lower limit of conditional expression (2), refractive power of the third lens group becomes too small, so that a moving amount of the third lens group upon zooming becomes large. Accordingly, variation in curvature of field upon zooming becomes large, so that it becomes difficult to correct it.

On the other hand, when the ratio f3/fw is equal to or exceeds the upper limit of conditional expression (2), refractive power of the third lens group becomes too large, so that spherical aberration becomes worse. Moreover, decentered aberration such as coma or astigmatism upon carrying out vibration reduction becomes worse.

In order to secure the effect of the present embodiment, it is preferable to set the upper limit of conditional expression (2) to −1.50.

In a zoom lens system according to the present embodiment, focusing on an object is carried out by moving the front group along the optical axis.

With this configuration, it becomes possible to decrease weight of the focusing lens group, and to excellently correct variation in aberration accompanied by focusing.

In a zoom lens system according to the present embodiment, it is preferable that a fourth lens group having positive refractive power is included, and upon zooming from the wide-angle end state to the telephoto end state, a distance between the second lens group and the third lens group increases, and a distance between the third lens group and the fourth lens group decreases.

With this configuration, it becomes possible to effectively carry out zooming by each lens group.

In a zoom lens system according to the present embodiment, it is preferable that the third lens group can be shifted in a direction substantially perpendicular to the optical axis.

With setting the third lens group as a vibration reduction lens group, it becomes possible to excellently correct coma or astigmatism generated upon vibration reduction.

In a zoom lens system according to the present embodiment, it is preferable that an aperture stop is included and moved in a body with the third lens group upon zooming from the wide-angle end state to the telephoto end state.

With this configuration, it becomes possible to correct off-axis coma in a well-balanced manner and to accomplish excellent optical performance.

In a zoom lens system according to the present embodiment, it is preferable that the third lens group includes a cemented lens.

With this configuration, it becomes possible to excellently correct variation in lateral chromatic aberration upon zooming.

In a zoom lens system according to the present embodiment, it is preferable that each of the second lens group and the fourth lens group has at least one cemented lens.

With this configuration, it becomes possible to excellently correct variation in lateral chromatic aberration upon zooming.

In a zoom lens system according to the present embodiment, it is preferable that the fourth lens group is composed of, in order from an image side, a cemented lens constructed by a negative lens cemented with a positive lens, and a single lens having positive refractive power.

With this configuration, it becomes possible to excellently correct lateral chromatic aberration, spherical aberration and coma with securing the distance between the third lens group and the fourth lens group.

In a zoom lens system according to the present embodiment, it is preferable that the first lens group is moved at first to the image side and then to the object side upon zooming from the wide-angle end state to the telephoto end state.

With this configuration, it becomes possible to accomplish the zoom lens system to be compact and to have a high zoom ratio.

In a zoom lens system according to the present embodiment, the following conditional expression (3) is preferably satisfied:

$$-0.60 < (d1w - d1t)/Y\text{max} < 0.17 \qquad (3)$$

where $d1w$ denotes a distance along the optical axis between the most object side lens surface of the zoom lens system and an image plane in the wide-angle end state, $d1t$ denotes a distance along the optical axis between the most object side lens surface of the zoom lens system and the image plane in the telephoto end state, and $Y\text{max}$ denotes the maximum image height.

Conditional expression (3) defines a moving condition of the first lens group upon zooming from the wide-angle end state to the telephoto end state. In a zoom lens system according to the present embodiment, with satisfying conditional expression (3), it becomes possible to accomplish excellent optical performance and compactness with effectively securing a designated zoom ratio.

When the ratio $(d1w-d1t)/Y\text{max}$ is equal to or falls below the lower limit of conditional expression (3), the moving amount of the first lens group having large refractive power upon zooming becomes too large, so that it becomes impossible to excellently correct spherical aberration over entire zoom range from the wide-angle end state to the telephoto end state.

In order to secure the effect of the present embodiment, it is preferable to set the lower limit of conditional expression (3) to −0.50.

On the other hand, when the ratio $(d1w-d1t)/Y\text{max}$ is equal to or exceeds the upper limit of conditional expression (3), since the moving amounts of the second lens group and the third lens group upon zooming become small, each refractive power of the second lens group and the third lens group becomes too large, so that spherical aberration becomes worse. Moreover, decentered aberration such as coma or astigmatism upon carrying out vibration reduction becomes worse.

In order to secure the effect of the present embodiment, it is preferable to set the upper limit of conditional expression (3) to 0.05.

In a zoom lens system according to the present embodiment, it is preferable that the most image side lens surface of the zoom lens system has a convex shape facing the image plane.

With this configuration, it becomes possible to reduce ghost images reflected from the image plane.

An optical apparatus according to the present embodiment is equipped with the zoom lens system having the above-described configuration.

Accordingly, it becomes possible to realize an optical apparatus having a high zoom ratio and excellent optical performance.

A method for zooming a zoom lens system according to the present embodiment comprising steps of: providing a zoom lens system comprising, in order from an object, a first lens group having negative refractive power, a second lens group having positive refractive power, and a third lens group having negative refractive power, the second lens group including, in order from the object, a front group having positive refractive power, and a rear group, the front group being moved along an optical axis of the zoom lens system upon focusing on the object, the following conditional expressions (1) and (2) being satisfied:

$$1.20 < f2/fw < 1.90 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state; and varying each distance between adjacent lens groups upon zooming from a wide-angle end state to a telephoto end state.

With this method, it becomes possible to realize a high zoom ratio and excellent optical performance.

A method for focusing a zoom lens system according to the present embodiment comprising steps of: providing the zoom lens system comprising, in order from an object, a first lens group having negative refractive power, a second lens group having positive refractive power, and a third lens group having negative refractive power, each distance between adjacent lens groups being varied upon zooming from a wide-angle end state to a telephoto end state, the second lens group including, in order from the object, a front group having positive refractive power, and a rear group, the following conditional expressions (1) and (2) being satisfied:

$$1.20 < f2/fw < 1.90 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state; and moving the front group along an optical axis of the zoom lens system upon focusing on the object.

With this method, it becomes possible to realize a high zoom ratio and excellent optical performance.

A zoom lens system of each example is explained below with reference to accompanying drawings.

EXAMPLE 1

FIG. 1 is a sectional view showing a lens configuration of a zoom lens system according to Example 1 of the present embodiment in a wide-angle end state.

The zoom lens system according to Example 1 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens in which an aspherical surface is formed on a resin layer disposed on the image side glass lens surface.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32. The object side lens surface of the positive meniscus lens L31 is an aspherical surface.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing the image.

In the zoom lens system according to Example 1, upon zooming from a wide-angle end state to a telephoto end state, the first lens group G1 is moved at first to the image side and then to the object side, the second lens group G2, the third lens group G3, and the fourth lens group G4 are moved to the object such that a distance between the second lens group G2 and the third lens group G3 increases, and a distance between the third lens group G3 and the fourth lens group G4 decreases.

An aperture stop S is disposed between the second lens group G2 and the third lens group G3, and moved together with the third lens group G3 upon zooming from the wide-angle end state to the telephoto end state.

In the zoom lens system according to Example 1, an image blur caused by a camera shake is corrected by shifting the third lens group G3 in a direction substantially perpendicular to the optical axis.

In the zoom lens system according to Example 1, the second lens group G2 is composed of, in order from the object, a front group G2a having positive refractive power, and a rear group G2b having positive refractive power. Focusing from infinity to a close object is carried out by moving the front group G2a along the optical axis.

Various values associated with the zoom lens system according to Example 1 are listed in Table 1.

In [Lens Data], the left most column "i" shows the lens surface number counted in order from the object side, the second column "r" shows a radius of curvature of the lens surface, the third column "d" shows a distance to the next surface, the fourth column "nd" shows refractive index of the material at d-line (wavelength=587.6 nm), and the fifth column "vd" shows Abbe number of the material at d-line (wavelength λ=587.6 nm). In the fifth column "nd" refractive index of the air nd=1.000000 is omitted. In the second column "r", r=∞ denotes a plane surface. In the third column "d", Bf denotes a back focal length.

In [Aspherical Data], an aspherical surface is exhibited by the following expression:

$$X(y) = (y^2/r) / \left[1 + [1 - \kappa (y^2/r^2)]^{1/2}\right] + A4 \times y^4 + A6 \times y^6 + A8 \times y^8 + A10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), κ denotes a conical coefficient, An denotes aspherical coefficient of n-th order, "E-n" denotes "×10$^{-n}$", for example, "1.234E-5" denotes "1.234×10$^{-5}$" and the position of an aspherical surface is expressed by attaching "*" to the right side of the surface number.

In [Specifications], W denotes a wide-angle end state, M denotes an intermediate focal length state, T denotes a telephoto end state, f denotes a focal length of the zoom lens system, FNO denotes an f-number, ω denotes a half angle of view in degrees, y denotes an image height, TL denotes a total lens length, and Bf denotes a back focal length.

In [Variable Distances], di denotes a variable distance at the surface number i, β denotes imaging magnification upon focusing on a close object, d0 denotes a distance between the object and the most object side lens surface.

In [Lens Group Data], a starting surface number "i" and a focal length of each lens group are shown. In [Values for Conditional Expressions], respective values with respect to conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

In the zoom lens system having a focal length of f, a vibration reduction coefficient, which is a ratio of a moving amount of an image on the image plane to that of the moving lens group perpendicularly to the optical axis upon correcting a camera shake, of K, in order to correct rotational camera shake of an angle θ, the moving lens group for correcting the camera shake may be moved by the amount of (f·tan θ)/K perpendicularly to the optical axis.

In the wide-angle end state in Example 1, the vibration reduction coefficient K is 1.097, and the focal length is 18.5 (mm), so that the moving amount of the third lens group G3 for correcting a rotational camera shake of 0.7 degrees is 0.206 (mm). In the telephoto end state, the vibration reduction coefficient K is 1.897, and the focal length is 53.4 (mm), so that the moving amount of the third lens group G3 for correcting a rotational camera shake of 0.4 degrees is 0.198 (mm).

TABLE 1

[Lens Data]

| i | r | d | nd | νd |
|---|---|---|---|---|
| 1 | 76.6711 | 1.90 | 1.516800 | 64.12 |
| 2 | 16.1960 | 0.15 | 1.553890 | 38.09 |
| 3* | 13.6679 | 9.20 | | |
| 4 | −108.0100 | 1.50 | 1.516800 | 64.12 |
| 5 | 25.3227 | 1.20 | | |
| 6 | 24.5263 | 2.90 | 1.717360 | 29.52 |
| 7 | 66.3231 | (d7) | | |
| 8 | 28.3050 | 1.00 | 1.795040 | 28.69 |
| 9 | 16.5196 | 3.80 | 1.516800 | 64.12 |
| 10 | −40.0046 | (d10) | | |
| 11 | 23.3582 | 2.40 | 1.518600 | 69.89 |
| 12 | 46.9081 | (d12) | | |
| 13 | ∞ | 0.40 | Aperture Stop S | |
| 14* | −37.8179 | 2.40 | 1.850260 | 32.35 |
| 15 | −12.0629 | 1.00 | 1.804000 | 46.58 |
| 16 | 99.4328 | (d16) | | |
| 17 | −345.9200 | 2.50 | 1.516800 | 64.12 |
| 18 | −23.8260 | 0.10 | | |

TABLE 1-continued

| 19 | 61.6524 | 5.70 | 1.487490 | 70.45 |
|---|---|---|---|---|
| 20 | −17.9642 | 1.00 | 1.850260 | 32.35 |
| 21 | −49.0586 | (d21) Bf | | |

[Aspherical Data]

Surface Number: 3

K = −1.0
A4 = 2.7914E−05
A6 = 5.5403E−08
A8 = −4.7221E−11
A10 = 1.0722E−12

Surface Number: 14

K = −1.0
A4 = −2.1349E−06
A6 = −1.7205E−09
A8 = 0.0000E+00
A10 = 0.0000E+00

[Specifications]
Zoom Ratio: 2.8864

| | W | M | T |
|---|---|---|---|
| f = | 18.5 | 34.7 | 53.4 |
| FNO = | 3.7 | 4.7 | 6.1 |
| ω = | 38.7 | 22.2 | 14.8 |
| Y = | 14.00 | 14.00 | 14.00 |
| TL = | 130.133 | 124.719 | 136.922 |
| Bf = | 37.624 | 54.431 | 74.106 |

[Variable Distances]

| | W | M | T |
|---|---|---|---|
| (Focusing on Infinity) | | | |
| d7 | 31.694 | 9.473 | 2.002 |
| d10 | 5.900 | 5.900 | 5.900 |
| d12 | 2.600 | 7.957 | 12.188 |
| d16 | 15.164 | 9.807 | 5.576 |
| d21 (Bf) | 37.624 | 54.431 | 74.106 |
| (Focusing on a close object) | | | |
| β | −0.033 | −0.033 | −0.033 |
| d0 | 507.490 | 1010.870 | 1573.940 |
| d7 | 33.975 | 10.122 | 2.416 |
| d10 | 3.620 | 5.251 | 5.486 |
| d12 | 2.600 | 7.957 | 12.188 |
| d16 | 15.164 | 9.807 | 5.576 |
| d21 (Bf) | 37.624 | 54.431 | 74.106 |

[Lens Group Data]

| Group | i | focal length |
|---|---|---|
| G1 | 1 | −25.7 |
| G2 | 8 | 29.7 |
| G3 | 14 | −37.1 |
| G4 | 17 | 39.2 |

[Values for Conditional Expressions]

(1): f2/fw = 1.60
(2): f3/fw = −2.00
(3): (d1w − d1t)/Ymax = −0.48

Figure 2A:
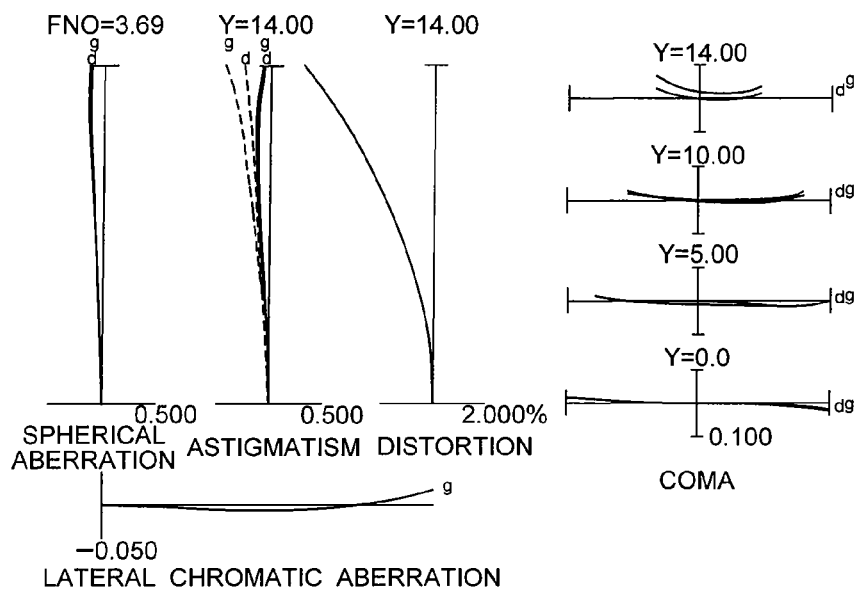
Figure 2B:
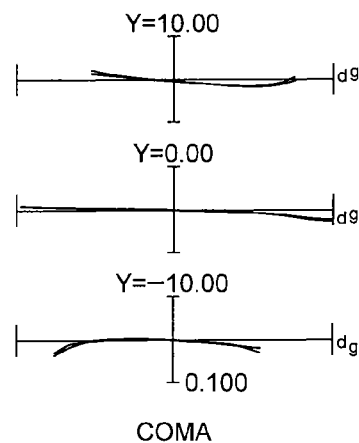
Figure 2C:
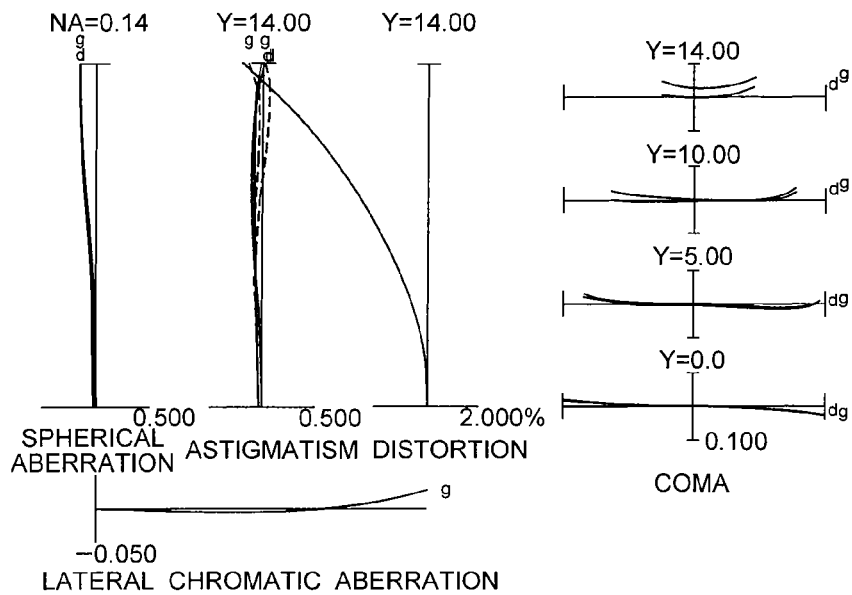

FIGS. 2A, 2B and 2C are graphs showing various aberrations of the zoom lens system according to Example 1 in the wide-angle end state, in which FIG. 2A shows various aberrations focusing on infinity, FIG. 2B shows coma upon performing vibration reduction with respect to a rotational camera shake of 0.7 degrees, and FIG. 2C shows various aberrations upon focusing on a close object at imaging magnification β=−0.033.

Figure 3A:
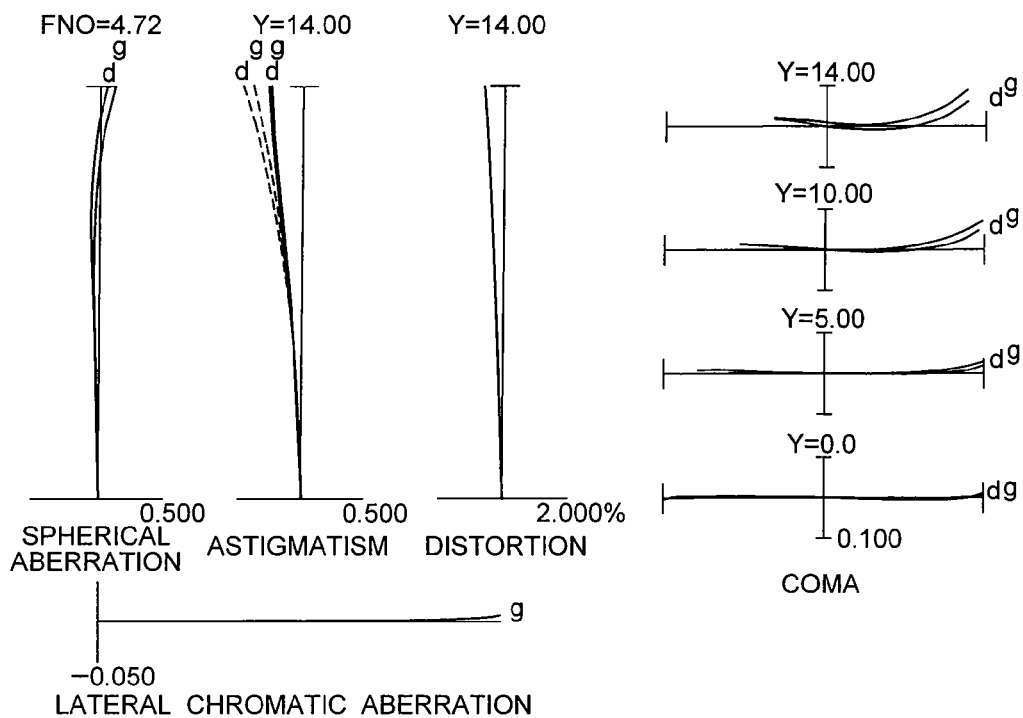
Figure 3B:
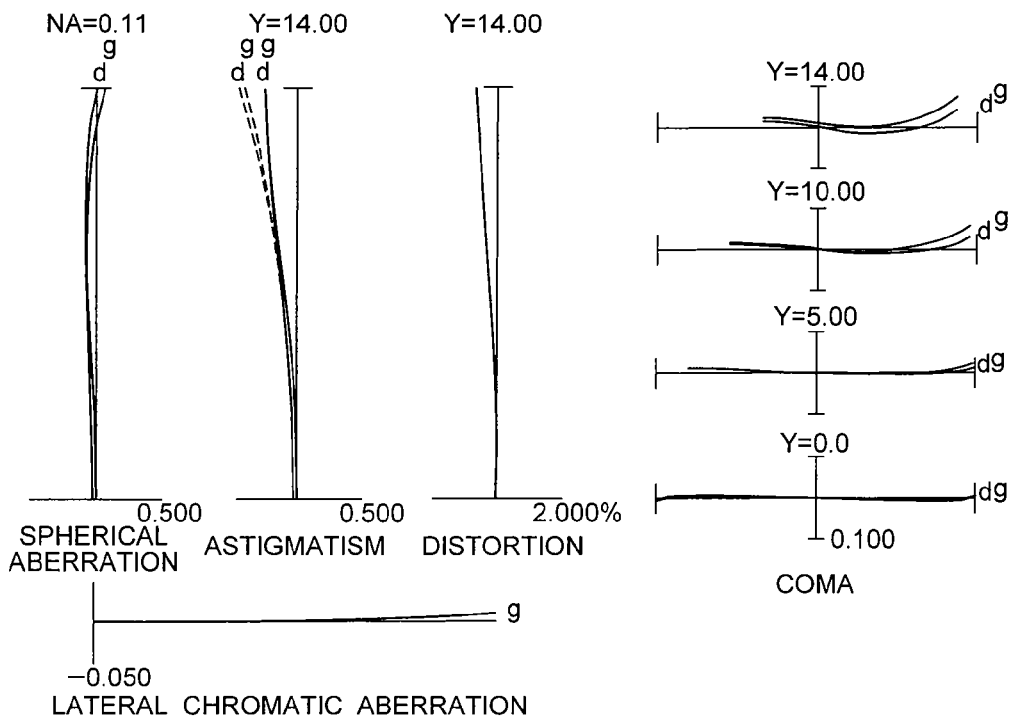

FIGS. 3A and 3B are graphs showing various aberrations of the zoom lens system according to Example 1 in an intermediate focal length state, in which FIG. 3A shows upon focusing on infinity, and FIG. 3B shows upon focusing on a close object at imaging magnification β=−0.033.

Figure 4A:
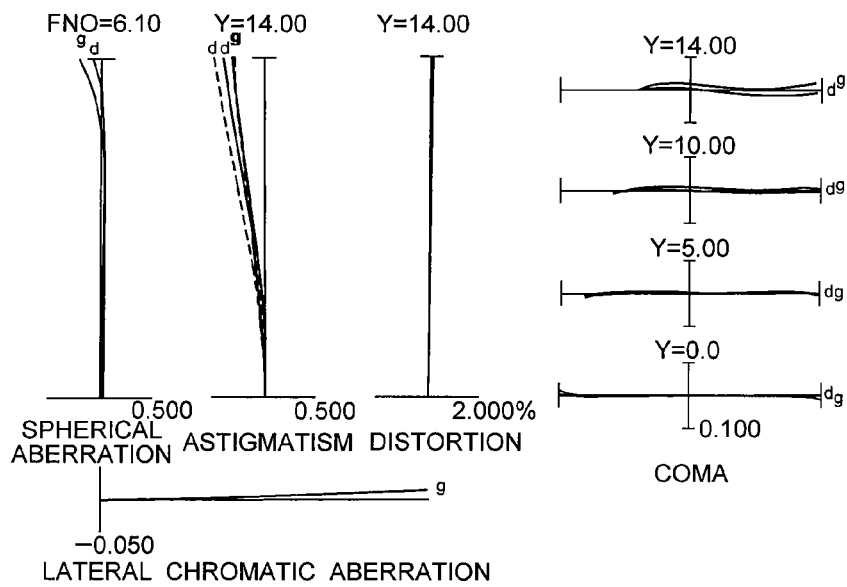
Figure 4B:
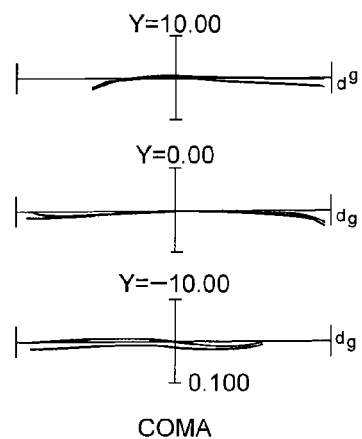
Figure 4C:
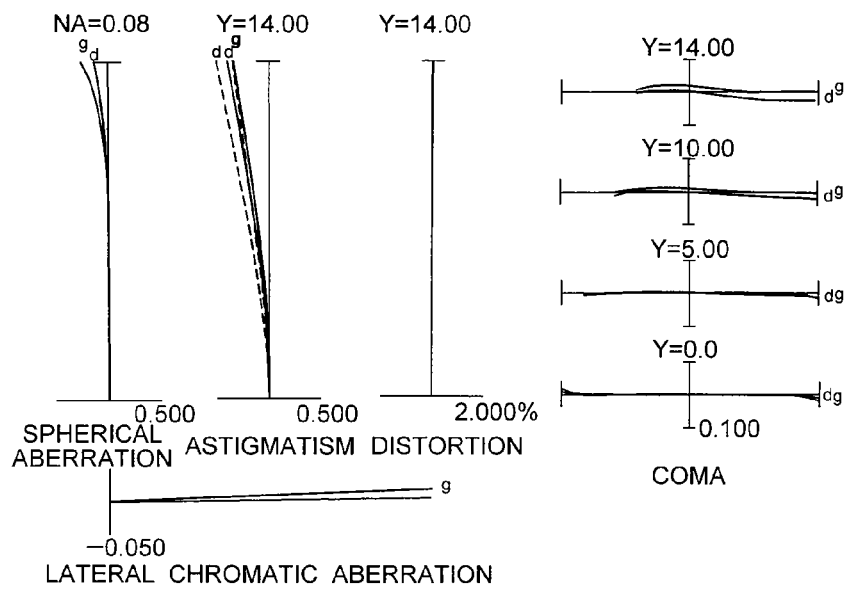

FIGS. 4A, 4B and 4C are graphs showing various aberrations of the zoom lens system according to Example 1 in a telephoto end state, in which FIG. 4A shows various aberrations focusing on infinity, FIG. 4B shows coma upon performing vibration reduction with respect to a rotational camera shake of 0.4 degrees, and FIG. 4C shows various aberrations upon focusing on a close object at imaging magnification β=−0.033.

In respective graphs, FNO denotes an f-number, Y denotes an image height, NA denotes a numerical aperture. In graphs showing spherical aberration, f-number with respect to the maximum aperture or the maximum numerical aperture is shown. In graphs showing astigmatism and distortion, the maximum value of the image height is shown. In graphs showing coma, coma with respect to each image height is shown. In respective graphs, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane. The above-described explanations regarding various aberration graphs are the same as the other Examples.

As is apparent from the respective graphs, the zoom lens system according to Example 1 shows superb optical performance as a result of good corrections to various aberrations in the wide-angle end state, in the intermediate focal length state, and in the telephoto end state.

EXAMPLE 2

Figure 5:
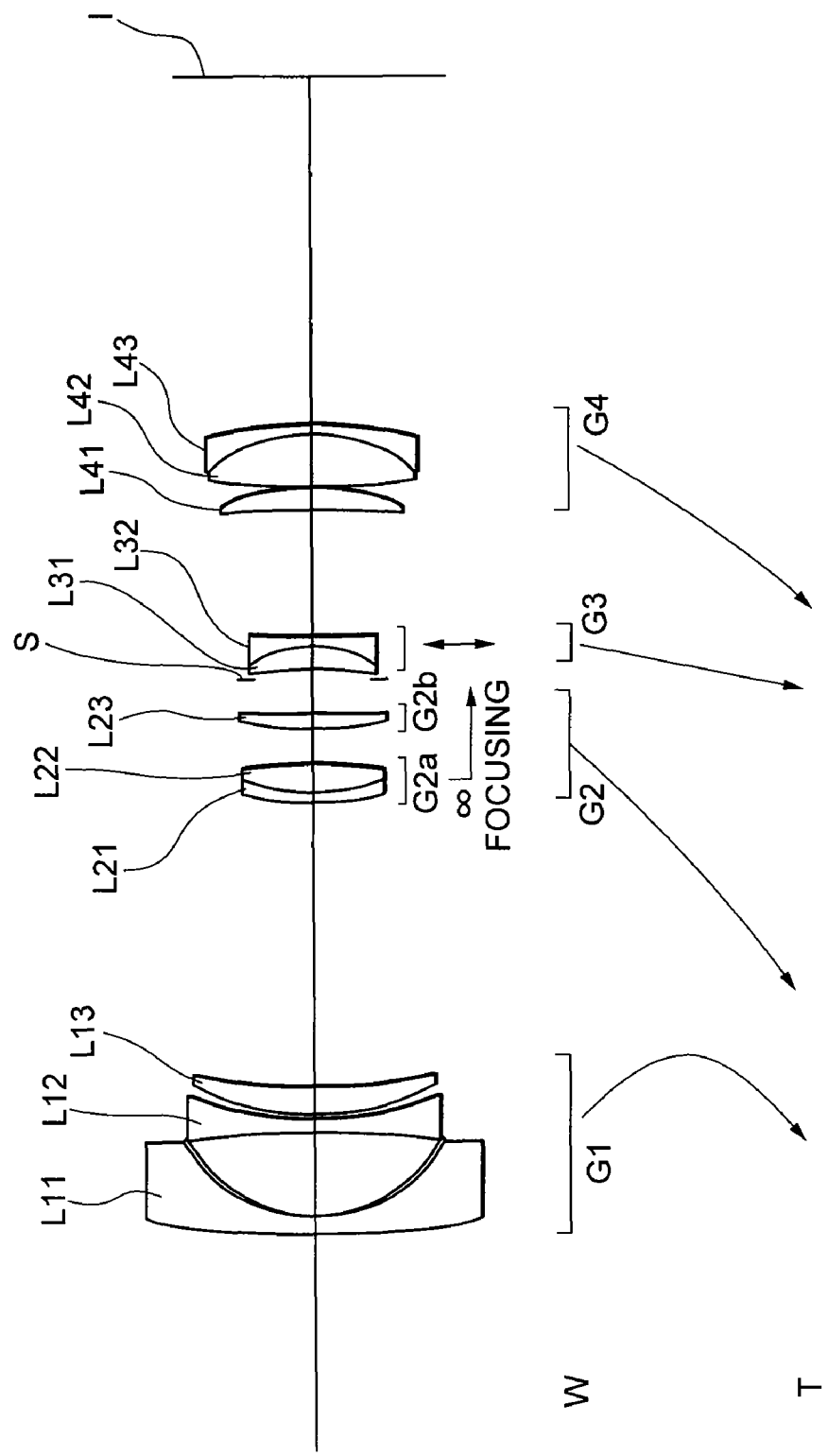
FIG. 5 is a sectional view showing a lens configuration of a zoom lens system according to Example 2 of the present embodiment in a wide-angle end state.

FIG. 5 is a sectional view showing a lens configuration of a zoom lens system according to Example 2 of the present embodiment in a wide-angle end state.

The zoom lens system according to Example 2 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens in which an aspherical surface is formed on a resin layer disposed on an image plane I side glass lens surface.

The second lens group G2 is composed of, in order from the object, a cemented lens constructed by a negative meniscus lens L21 having a convex surface facing the object cemented with a double convex positive lens L22, and a double convex positive lens L23.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing the image.

In the zoom lens system according to Example 2, upon zooming from a wide-angle end state to a telephoto end state, the first lens group G1 is moved at first to the image side and then to the object side, the second lens group G2, the third lens group G3, and the fourth lens group G4 are moved to the object such that a distance between the second lens group G2 and the third lens group G3 increases, and a distance between the third lens group G3 and the fourth lens group G4 decreases.

An aperture stop S is disposed between the second lens group G2 and the third lens group G3, and moved together with the third lens group G3 upon zooming from the wide-angle end state to the telephoto end state.

In the zoom lens system according to Example 2, an image blur caused by a camera shake is corrected by shifting the third lens group G3 in a direction substantially perpendicular to an optical axis.

In the zoom lens system according to Example 2, the second lens group G2 is composed of, in order from the object, a front group G2a having positive refractive power, and a rear group G2b having positive refractive power. Focusing from infinity to a close object is carried out by moving the front group G2a along the optical axis.

In the zoom lens system according to Example 2, in the wide-angle end state, the vibration reduction coefficient K is 1.080, and the focal length is 18.5 (mm), so that the moving amount of the third lens group G3 for correcting a rotational camera shake of 0.7 degrees is 0.209 (mm). In the telephoto end state, the vibration reduction coefficient K is 1.914, and the focal length is 53.4 (mm), so that the moving amount of the third lens group G3 for correcting a rotational camera shake of 0.4 degrees is 0.203 (mm).

Various values associated with the zoom lens system according to Example 2 are listed in Table 2.

TABLE 2

[Lens Data]

| i | r | d | nd | vd |
|---|---|---|---|---|
| 1 | 100.2745 | 1.80 | 1.516800 | 64.10 |
| 2 | 15.5000 | 0.15 | 1.553890 | 38.09 |
| 3* | 13.2795 | 9.00 | | |
| 4 | −156.5550 | 1.50 | 1.516800 | 64.10 |
| 5 | 32.0305 | 0.50 | | |
| 6 | 25.4347 | 3.00 | 1.755199 | 27.51 |
| 7 | 56.1425 | (d7) | | |
| 8 | 28.5221 | 1.00 | 1.784723 | 25.68 |
| 9 | 15.8457 | 3.20 | 1.517420 | 52.31 |
| 10 | −92.5316 | (d10) | | |
| 11 | 27.3382 | 1.80 | 1.518601 | 69.98 |
| 12 | −1019.5800 | (d12) | | |
| 13 | ∞ | 1.00 | Aperture Stop S | |
| 14 | −45.4911 | 2.50 | 1.850260 | 32.35 |
| 15 | −11.8100 | 1.00 | 1.794997 | 45.29 |
| 16 | 65.4532 | (d16) | | |
| 17 | −201.4780 | 2.50 | 1.497820 | 82.52 |
| 18 | −24.2776 | 0.10 | | |
| 19 | 52.9747 | 5.80 | 1.516800 | 64.10 |
| 20 | −17.3379 | 1.00 | 1.803840 | 33.89 |
| 21 | −57.0853 | (d21) Bf | | |

[Aspherical Data]
Surface Number: 3

K = −0.4102
A4 = −2.5862E−06
A6 = −2.9897E−08
A8 = 1.2079E−10
A10 = −5.2684E−13

TABLE 2-continued

[Specifications]
Zoom Ratio: 2.8864

| | W | M | T |
|---|---|---|---|
| f = | 18.5 | 34.8 | 53.4 |
| FNO = | 3.6 | 4.6 | 5.9 |
| ω = | 38.4 | 22.1 | 14.7 |
| Y = | 14.00 | 14.00 | 14.00 |
| TL = | 126.319 | 120.149 | 131.726 |
| Bf = | 37.819 | 53.646 | 72.796 |

[Variable Distances]

| | W | M | T |
|---|---|---|---|
| (Focusing on Infinity) | | | |
| d7 | 31.038 | 9.040 | 1.468 |
| d10 | 3.951 | 3.951 | 3.951 |
| d12 | 3.796 | 9.136 | 12.904 |
| d16 | 13.866 | 8.526 | 4.757 |
| d21 (Bf) | 37.819 | 53.646 | 72.796 |
| (Focusing on a close object) | | | |
| β | −0.033 | −0.033 | −0.033 |
| d0 | 524.960 | 1018.360 | 1578.170 |
| d7 | 32.304 | 9.745 | 1.968 |
| d10 | 2.684 | 3.246 | 3.451 |
| d12 | 3.796 | 9.136 | 12.904 |
| d16 | 13.866 | 8.526 | 4.757 |
| d21 (Bf) | 37.819 | 53.646 | 72.796 |

[Lens Group Data]

| Group | i | focal length |
|---|---|---|
| G1 | 1 | −26.3 |
| G2 | 8 | 29.6 |
| G3 | 14 | −37.8 |
| G4 | 17 | 39.1 |

[Values for Conditional Expressions]

| (1): f2/fw = | 1.602 |
|---|---|
| (2): f3/fw = | −2.04 |
| (3): (d1w − d1t)/Ymax = | −0.38 |

Figure 6A:
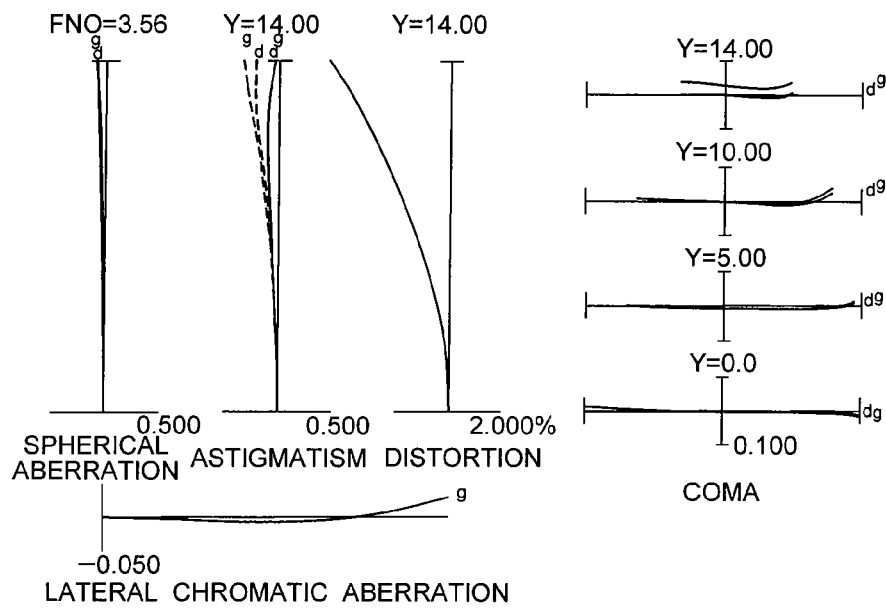
Figure 6B:
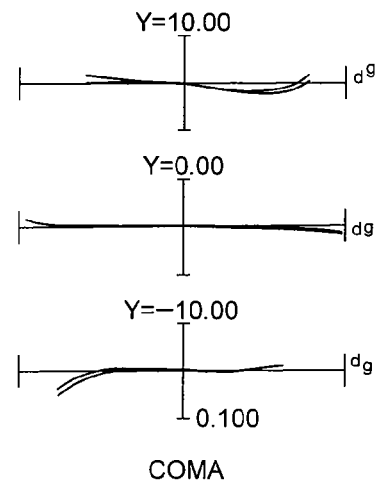
Figure 6C:
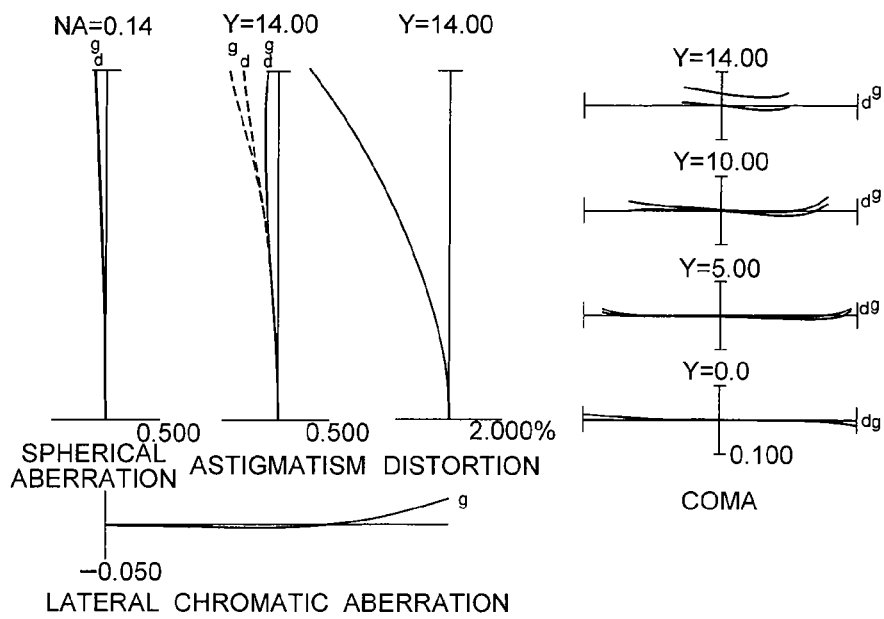

FIGS. 6A, 6B and 6C are graphs showing various aberrations of the zoom lens system according to Example 2 in the wide-angle end state, in which FIG. 6A shows various aberrations focusing on infinity, FIG. 6B shows coma upon performing vibration reduction with respect to a rotational camera shake of 0.7 degrees, and FIG. 6C shows various aberrations upon focusing on a close object at imaging magnification β=−0.033.

Figure 7A:
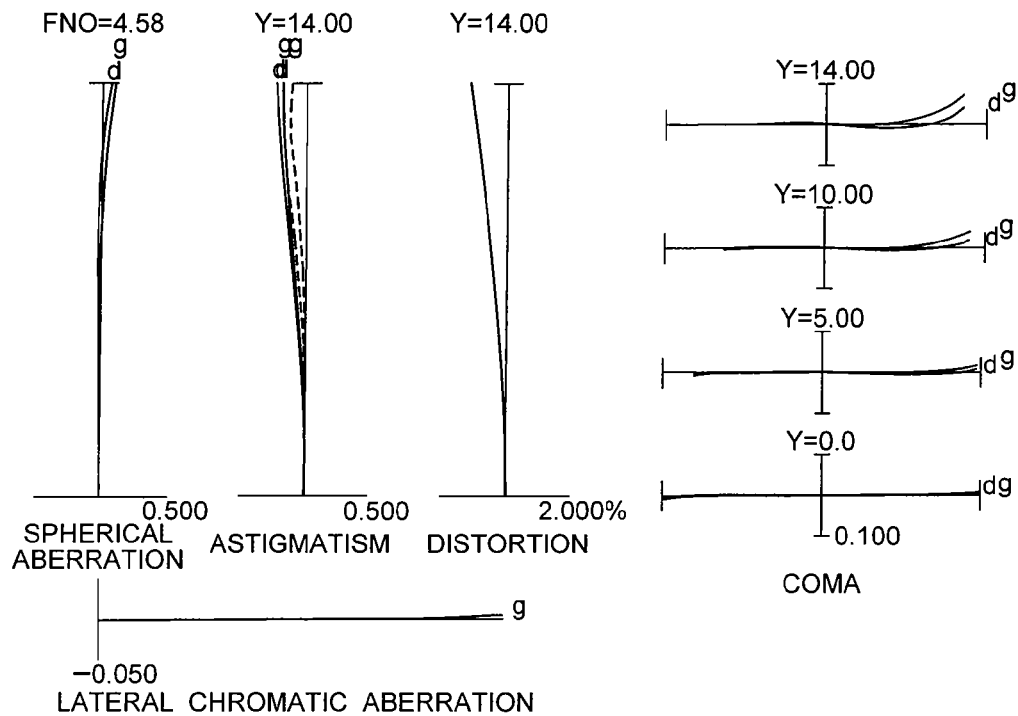
Figure 7B:
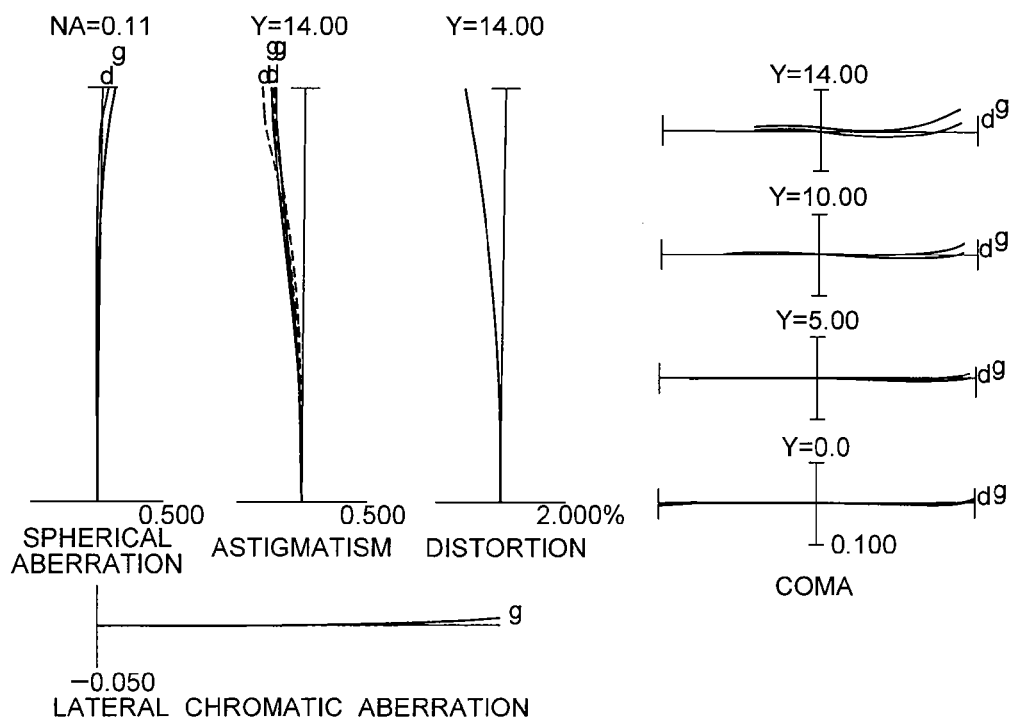

FIGS. 7A and 7B are graphs showing various aberrations of the zoom lens system according to Example 2 in an intermediate focal length state, in which FIG. 7A shows upon focusing on infinity, and FIG. 7B shows upon focusing on a close object at imaging magnification β=−0.033.

Figure 8A:
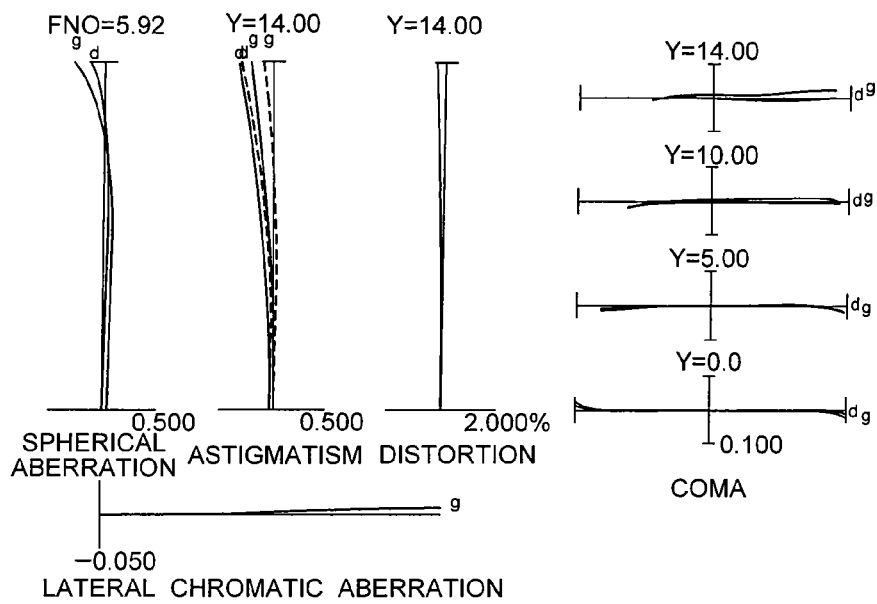
Figure 8B:
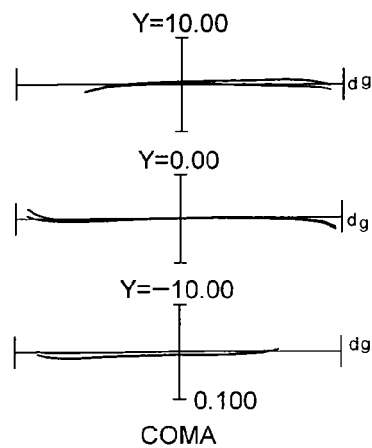
Figure 8C:
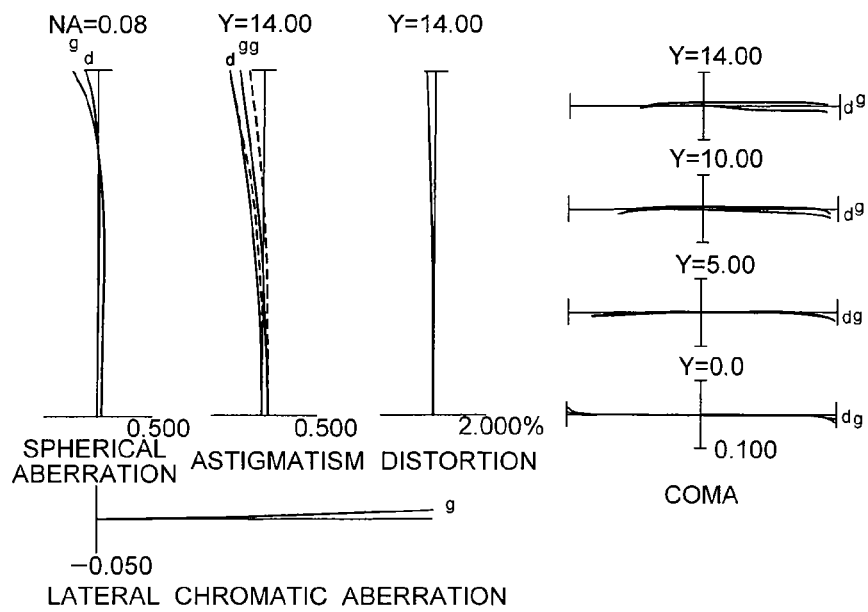

FIGS. 8A, 8B and 8C are graphs showing various aberrations of the zoom lens system according to Example 2 in a telephoto end state, in which FIG. 8A shows various aberrations focusing on infinity, FIG. 8B shows coma upon performing vibration reduction with respect to a rotational camera shake of 0.4 degrees, and FIG. 8C shows various aberrations upon focusing on a close object at imaging magnification β=−0.033.

As is apparent from the respective graphs, the zoom lens system according to Example 2 shows superb optical performance as a result of good corrections to various aberrations in the wide-angle end state, in the intermediate focal length state, and in the telephoto end state.

EXAMPLE 3

Figure 9:
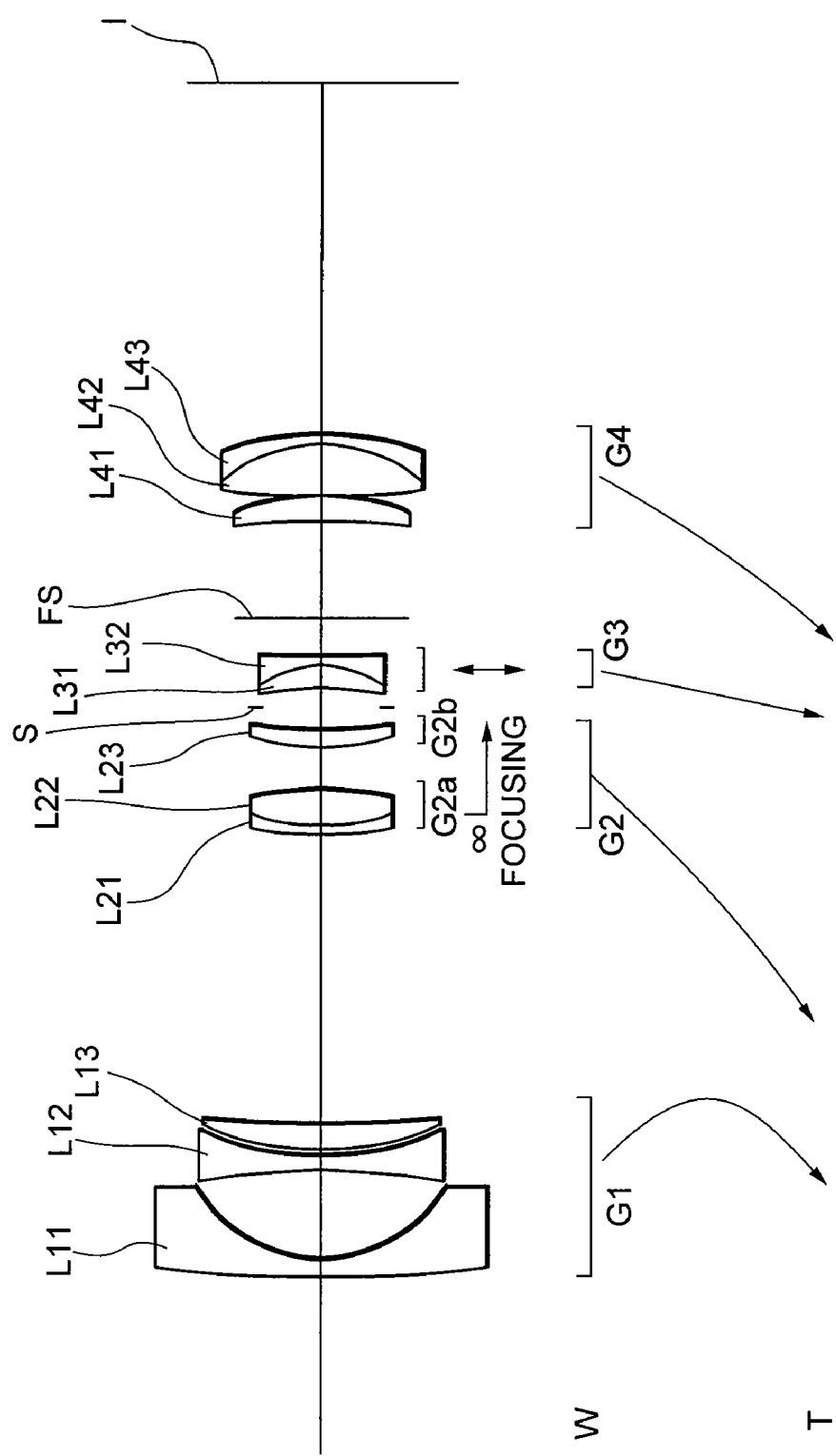
FIG. 9 is a sectional view showing a lens configuration of a zoom lens system in a wide-angle end state according to Example 3 of the present embodiment.

FIG. 9 is a sectional view showing a lens configuration of a zoom lens system according to Example 3 of the present embodiment in a wide-angle end state.

The zoom lens system according to Example 3 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens in which an aspherical surface is formed on a resin layer disposed on an image plane I side glass lens surface.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing the image.

In the zoom lens system according to Example 3, upon zooming from a wide-angle end state to a telephoto end state, the first lens group G1 is moved at first to the image side and then to the object side, the second lens group G2, the third lens group G3, and the fourth lens group G4 are moved to the object such that a distance between the second lens group G2 and the third lens group G3 increases, and a distance between the third lens group G3 and the fourth lens group G4 decreases.

An aperture stop S is disposed between the second lens group G2 and the third lens group G3, and moved together with the third lens group G3 upon zooming from the wide-angle end state to the telephoto end state.

In the zoom lens system according to Example 3, an image blur caused by a camera shake is corrected by shifting the third lens group G3 in a direction substantially perpendicular to an optical axis.

A flare stopper FS is disposed in the vicinity of the third lens group and moved in a body with the third lens group.

In the zoom lens system according to Example 3, the second lens group G2 is composed of, in order from the object, a front group G2a having positive refractive power, and a rear group G2b having positive refractive power. Focusing from infinity to a close object is carried out by moving the front group G2a along the optical axis.

In the zoom lens system according to Example 3, in the wide-angle end state, the vibration reduction coefficient K is 1.143, and the focal length is 18.5 (mm), so that the moving amount of the third lens group G3 for correcting a rotational camera shake of 0.7 degrees is 0.198 (mm). In the telephoto end state, the vibration reduction coefficient K is 1.929, and the focal length is 53.4 (mm), so that the moving amount of the third lens group G3 for correcting a rotational camera shake of 0.4 degrees is 0.193 (mm).

Various values associated with a zoom lens system according to Example 3 are listed in Table 3.

TABLE 3

[Lens Data]

| i | r | d | nd | vd |
|---|---|---|---|---|
| 1 | 120.0750 | 1.90 | 1.516800 | 64.12 |
| 2 | 16.0000 | 0.17 | 1.553890 | 38.09 |
| 3* | 13.6190 | 9.50 | | |
| 4 | −82.2133 | 1.50 | 1.516800 | 64.12 |
| 5 | 31.2246 | 0.50 | | |
| 6 | 28.2589 | 2.90 | 1.728250 | 28.46 |
| 7 | 94.9739 | (d7) | | |
| 8 | 31.7022 | 1.00 | 1.805180 | 25.43 |
| 9 | 18.6003 | 4.00 | 1.516800 | 64.12 |
| 10 | −40.8517 | (d10) | | |
| 11 | 23.4934 | 2.00 | 1.618000 | 63.38 |
| 12 | 50.1283 | (d12) | | |
| 13 | ∞ | 2.00 | Aperture Stop S | |
| 14 | −38.6050 | 2.50 | 1.850260 | 32.35 |
| 15 | −11.2143 | 0.90 | 1.804000 | 46.58 |
| 16 | 81.8324 | 4.30 | | |
| 17 | ∞ | (d17) | Flare Stopper FS | |
| 18 | −169.2280 | 2.90 | 1.516800 | 64.12 |
| 19 | −26.8105 | 0.10 | | |
| 20 | 74.6396 | 5.60 | 1.497820 | 82.56 |
| 21 | −16.9392 | 1.00 | 1.850260 | 32.35 |
| 22 | −36.9823 | (d22)Bf | | |

[Aspherical Data]
Surface Number: 3

K = −1
A4 = 2.4135E−05
A6 = 3.2982E−08
A8 = 7.9053E−11
A10 = 3.8408E−13

[Specifications]
Zoom Ratio: 2.8864

| | W | M | T |
|---|---|---|---|
| f = | 18.5 | 34.7 | 53.4 |
| FNO = | 3.6 | 4.6 | 5.9 |
| ω = | 38.5 | 22.1 | 14.7 |
| Y = | 14.00 | 14.00 | 14.00 |
| TL = | 130.546 | 125.180 | 137.382 |
| Bf = | 38.293 | 55.148 | 74.822 |

[Variable Distances]

| | W | M | T |
|---|---|---|---|
| (Focusing on Infinity) | | | |
| d7 | 31.694 | 9.473 | 2.002 |
| d10 | 4.600 | 4.600 | 4.600 |
| d12 | 2.600 | 7.957 | 12.188 |
| d17 | 10.588 | 5.231 | 1.000 |
| d22 (Bf) | 38.293 | 55.148 | 74.822 |
| (Focusing on a Close Object) | | | |
| β | −0.033 | −0.033 | −0.033 |
| d0 | 517.340 | 1014.110 | 1575.730 |
| d7 | 33.350 | 10.082 | 2.402 |
| d10 | 2.945 | 3.992 | 4.200 |
| d12 | 2.600 | 7.957 | 12.188 |
| d17 | 10.588 | 5.231 | 1.000 |
| d22 (Bf) | 38.293 | 55.148 | 74.822 |

[Lens Group Data]

| Group | i | focal length |
|---|---|---|
| G1 | 1 | −25.2 |
| G2 | 8 | 28.6 |
| G3 | 14 | −35.7 |
| G4 | 18 | 40.0 |

[Values for Conditional Expressions]

(1): f2/fw = 1.54
(2): f3/fw = −1.93
(3): (d1w − d1t)/Ymax = −0.48

Figure 10A:
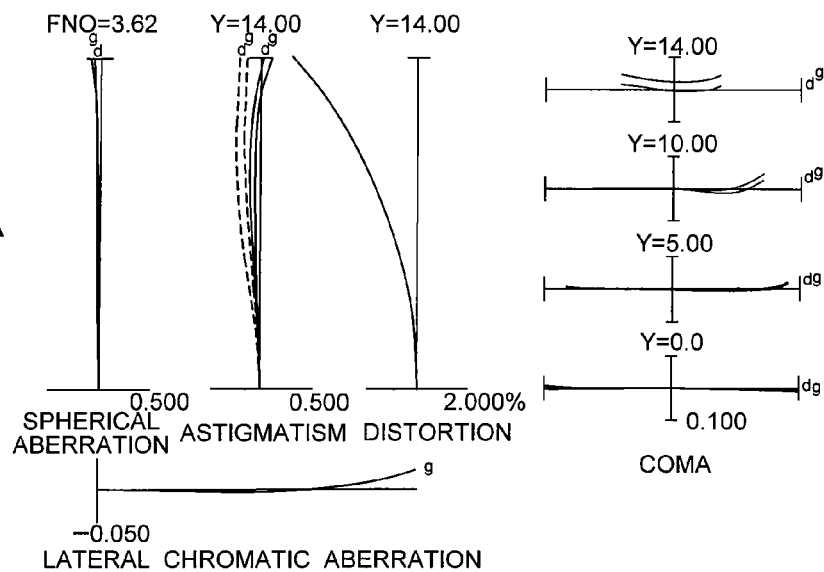
Figure 10B:
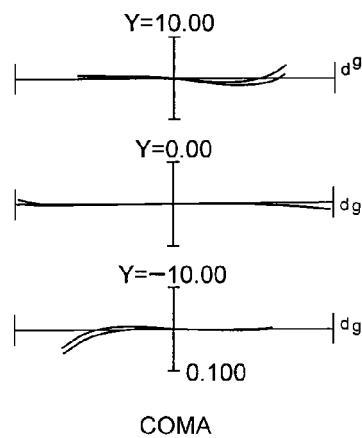
Figure 10C:
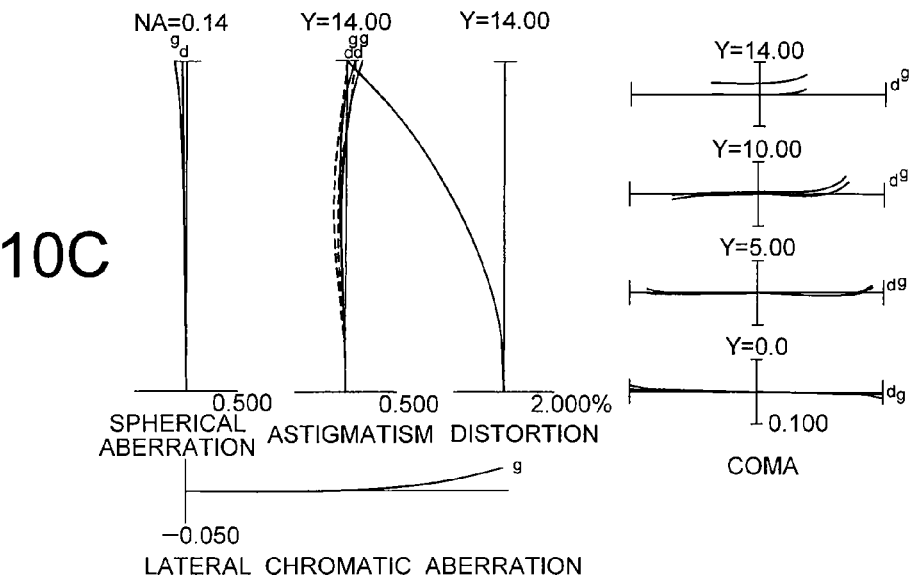

FIGS. 10A, 10B and 10C are graphs showing various aberrations of the zoom lens system according to Example 3 in the wide-angle end state, in which FIG. 10A shows various aberrations focusing on infinity, FIG. 10B shows coma upon performing vibration reduction with respect to a rotational camera shake of 0.7 degrees, and FIG. 10C shows various aberrations upon focusing on a close object at imaging magnification β=−0.033.

Figure 11A:
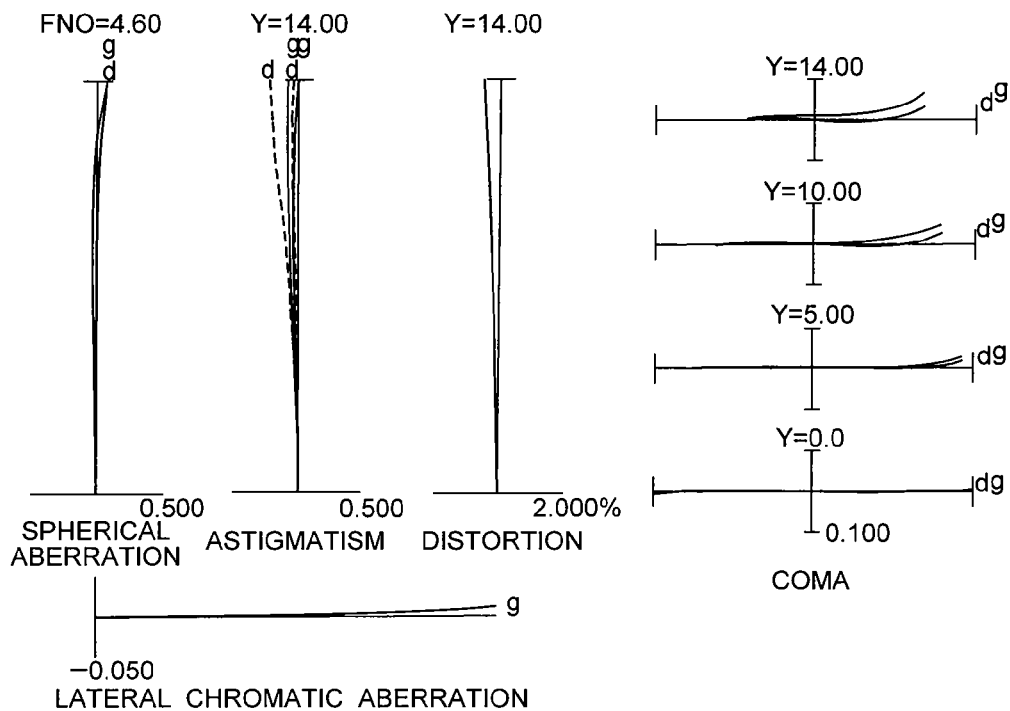
Figure 11B:
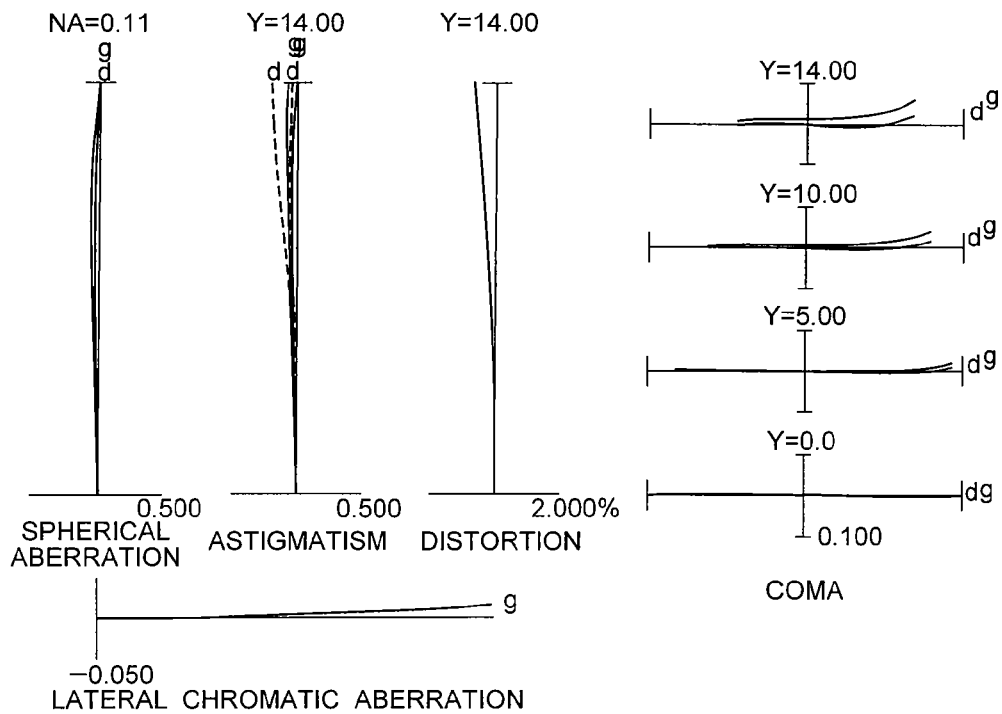

FIGS. 11A and 11B are graphs showing various aberrations of the zoom lens system according to Example 3 in an intermediate focal length state, in which FIG. 11A shows upon focusing on infinity, and FIG. 11B shows upon focusing on a close object at imaging magnification β=−0.033.

Figure 12A:
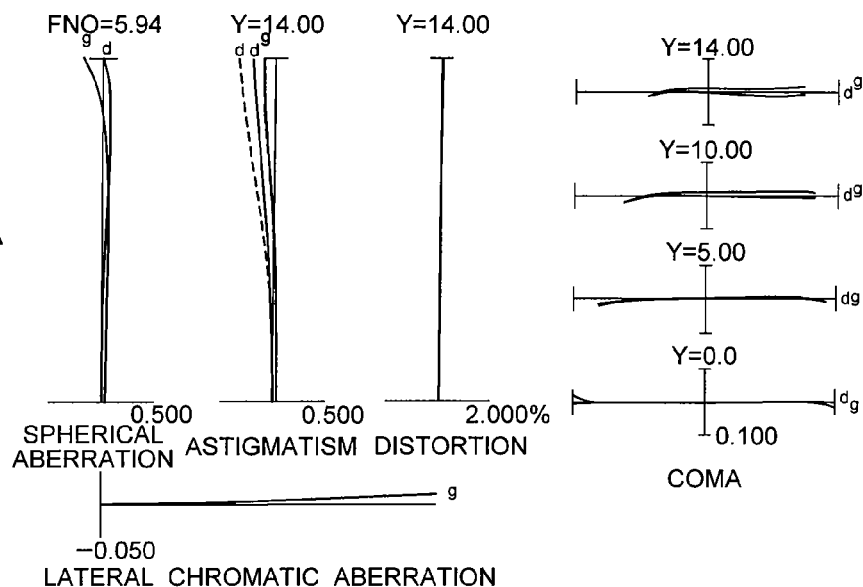
Figure 12B:
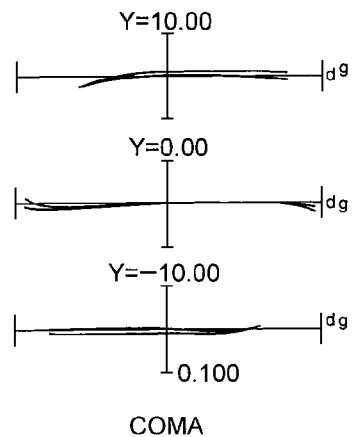
Figure 12C:
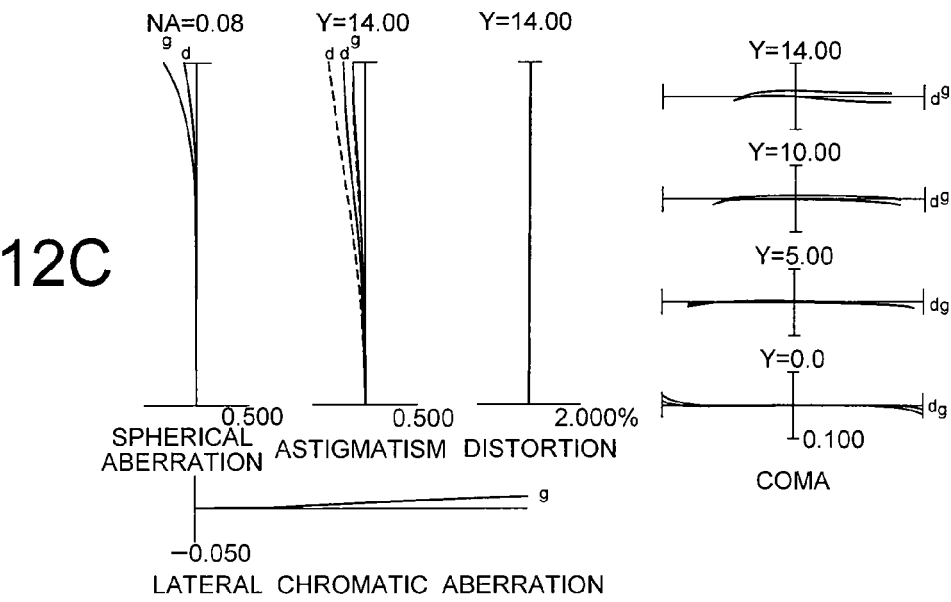

FIGS. 12A, 12B and 12C are graphs showing various aberrations of the zoom lens system according to Example 3 in a telephoto end state, in which FIG. 12A shows various aberrations focusing on infinity, FIG. 12B shows coma upon performing vibration reduction with respect to a rotational camera shake of 0.4 degrees, and FIG. 12C shows various aberrations upon focusing on a close object at imaging magnification β=−0.033.

As is apparent from the respective graphs, the zoom lens system according to Example 3 shows superb optical performance as a result of good corrections to various aberrations in the wide-angle end state, in the intermediate focal length state, and in the telephoto end state.

As described above, each Example makes it possible to provide a zoom lens system having a high zoom ratio and high optical performance with a vibration reduction function, suitable for a film camera, an electronic still camera, a video camera, and the like.

Then, a camera equipped with the zoom lens system according to the present embodiment is explained below.

Figure 13:
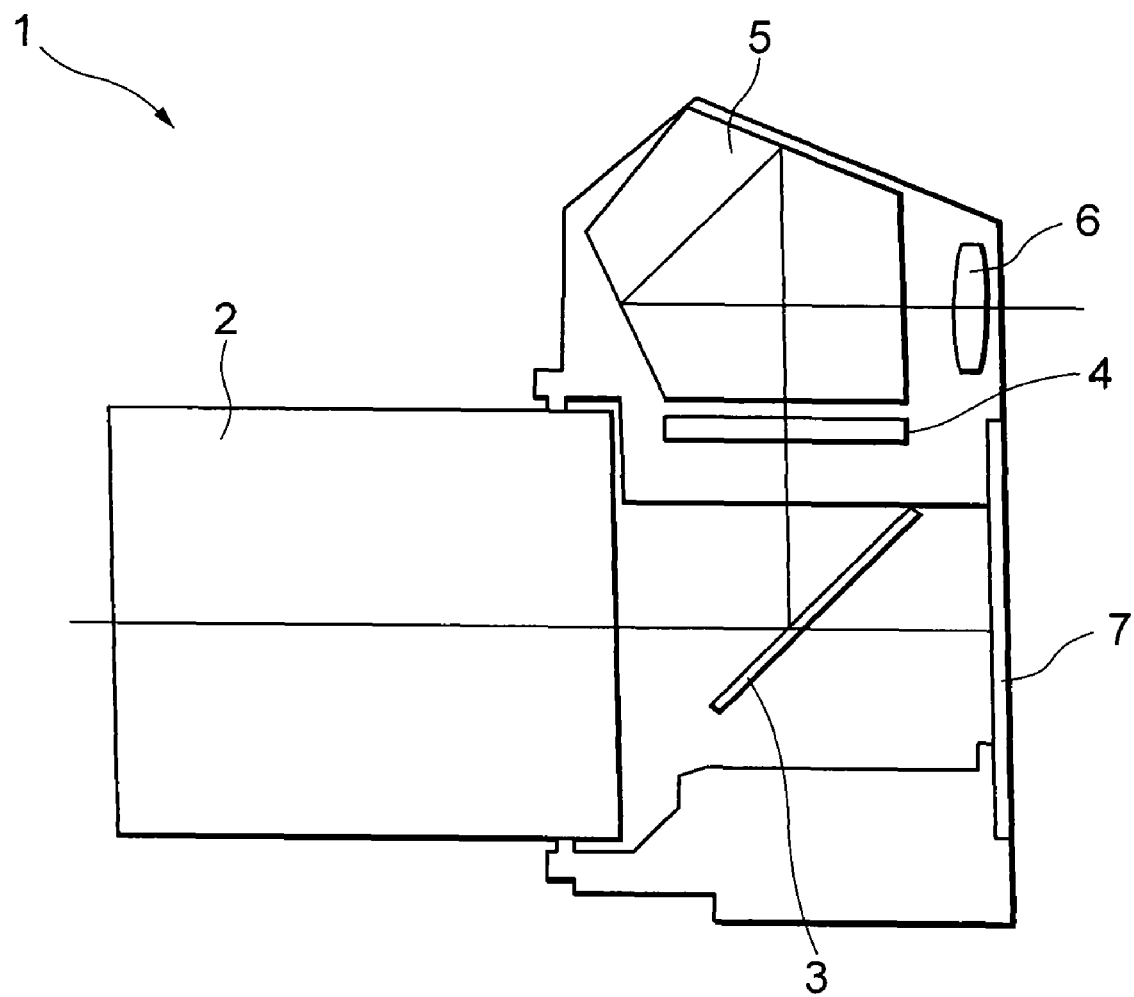
FIG. 13 is a graph showing a camera equipped with the zoom lens system according to Example 1.

FIG. 13 is a schematic diagram showing a camera equipped with the zoom lens system according to Example 1 of the present embodiment.

As shown in FIG. 13, the camera 1 is a single-lens reflex digital camera equipped with the zoom lens system according to Example 1 as an image-taking lens 2. Although a case that the zoom lens system according to Example 1 is used is explained, the same result can be obtained by the other Examples.

In the camera 1, light emitted from an object (not shown) is converged by an image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is removed from an optical path, and the light from the object (not shown) reaches an imaging device 7. Accordingly, light from the object is captured by the imaging device 7 and stored in a memory (not shown) as an object image. In this manner, the photographer can take a picture of the object by the camera 1.

The zoom lens system according to Example 1 of the present embodiment attached to the camera 1 as an image-taking lens 2 makes it possible to realize a vibration reduction function, a high zoom ratio, and high optical performance by means of the specific lens configuration. Accordingly, the camera 1 makes it possible to realize a vibration reduction function, a high zoom ratio, and high optical performance.

Incidentally, the following description may suitably be applied within limits that do not deteriorate optical performance.

Although a zoom lens system with a four-lens-group configuration is shown as each Example of the present embodiment, the present embodiment can be applied to other lens-group configurations such as a five-lens-group configuration, and a six-lens-group configuration.

In each Example, in order to carry out focusing from infinity to a close object, a portion of a lens group, a single lens group, or a plurality of lens groups may be moved along the optical axis.

The focusing lens group(s) may be used for auto focus, and suitable for being driven by a motor such as an ultrasonic motor. In a zoom lens system according to the present embodiment, it is preferable that a portion of the second lens group is used for the focusing lens group.

A lens group or a portion of a lens group may be sifted in a direction perpendicular to the optical axis as a vibration reduction lens group for correcting an image blur caused by a camera shake. It is particularly preferable that the second lens group or the third lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed in the vicinity of the third lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A zoom lens system comprising, in order from an object side:
    a first lens group having negative refractive power;
    a second lens group having positive refractive power; and
    a third lens group having negative refractive power,
    each distance between adjacent lens groups being variable for zooming from a wide-angle end state to a telephoto end state,
    the second lens group including, in order from the object side, a front group having positive refractive power, and a rear group,
    the front group consisting of only a cemented lens and being movable along an optical axis of the zoom lens system for focusing on the object,
    the first lens group being movable at first to an image side and then to the object side for zooming from the wide-angle end state to the telephoto end state, and
    the following conditional expressions being satisfied:

$$1.20 < f2/fw < 1.90$$

$$-2.10 < f3/fw < -0.80$$

where f2 denotes a focal length of the second lens group, f3 denotes a focal length of the third lens group, and fw denotes a focal length of the zoom lens system in the wide-angle end state.

2. The zoom lens system according to claim 1, further comprising a fourth lens group having positive refractive power, wherein upon zooming from the wide-angle end state to the telephoto end state, a distance between the second lens group and the third lens group increases, and a distance between the third lens group and the fourth lens group decreases.

3. The zoom lens system according to claim 2, wherein the fourth lens group includes a cemented lens.

4. The zoom lens system according to claim 2, wherein the fourth lens group consists of, in order from an image side, a cemented lens constructed by a negative lens cemented with a positive lens, and a single lens having positive refractive power.

5. The zoom lens system according to claim 1, wherein the third lens group can be shifted in a direction substantially perpendicular to the optical axis.

6. The zoom lens system according to claim 1, wherein at least a portion of the third lens group can be shifted in a direction substantially perpendicular to the optical axis.

7. The zoom lens system according to claim 1, wherein at least a portion of the second lens group can be shifted in a direction substantially perpendicular to the optical axis.

8. The zoom lens system according to claim 1, further comprising an aperture stop, wherein the aperture stop is movable together with the third lens group for zooming from the wide-angle end state to the telephoto end state.

9. The zoom lens system according to claim 1, wherein the third lens group includes a cemented lens.

10. The zoom lens system according to claim 1, wherein the second lens group includes at least one cemented lens.

11. The zoom lens system according to claim 1, wherein the following conditional expression is satisfied:

$$-0.60 < (d1w - d1t)/Y\max < 0.17$$

where $d1w$ denotes a distance between the most object side lens surface of the zoom lens system and an image plane in the wide-angle end state, $d1t$ denotes a distance between the most object side lens surface of the zoom lens system and the image plane in the telephoto end state, and $Y\max$ denotes the maximum image height.

12. The zoom lens system according to claim 1, wherein the most image side lens surface of the zoom lens system is a convex surface facing the image.

13. An optical apparatus equipped with the zoom lens system according to claim 1.

14. A method for zooming a zoom lens system comprising steps of:
    providing the zoom lens system comprising, in order from an object, a first lens group having negative refractive power, a second lens group having positive refractive power, and a third lens group having negative refractive power, the second lens group including, in order from the object, a front group having positive refractive power and a rear group, the front group consisting of only a cemented lens and being moved along an optical axis of the zoom lens system upon focusing on the object, and the first lens group being moved at first to an image side and then to the object side for zooming from a wide-angle end state to a telephoto end state,
the following conditional expressions being satisfied:

$$1.20<f2/fw<1.90$$

$$-2.10<f3/fw<-0.80$$

where f2 denotes a focal length of the second lens group, f3 denotes a focal length of the third lens group, and fw denotes a focal length of the zoom lens system in the wide-angle end state; and
varying each distance between adjacent lens groups upon zooming from the wide-angle end state to the telephoto end state.

15. The method according to claim 14, further comprising a step of:
shifting at least a portion of the third lens group in a direction substantially perpendicular to the optical axis.

16. The method according to claim 14, further comprising a step of:
providing the third lens group that includes a cemented lens.

17. The method according to claim 14, further comprising a step of:
providing the second lens group that includes at least one cemented lens.

18. A zoom lens system comprising, in order from an object side: a first lens group having negative refractive power;
a second lens group having positive refractive power; and
a third lens group having negative refractive power,
each distance between adjacent lens groups being variable for zooming from a wide-angle end state to a telephoto end state,
the second lens group including, in order from the object side, a front group having positive refractive power, and a rear group,
the front group consisting of only a cemented lens and being movable along an optical axis of the zoom lens system for focusing on the object,
the third lens group including a cemented lens, and
the following conditional expressions being satisfied:

$$1.20<f2/fw<1.90$$

$$-2.10<f3/fw<-0.80$$

where f2 denotes a focal length of the second lens group, f3 denotes a focal length of the third lens group, and fw denotes a focal length of the zoom lens system in the wide-angle end state.

19. A zoom lens system comprising, in order from an object side:
a first lens group having negative refractive power;
a second lens group having positive refractive power; and
a third lens group having negative refractive power,
each distance between adjacent lens groups being variable for zooming from a wide-angle end state to a telephoto end state,
the second lens group including, in order from the object side, a front group having positive refractive power, and a rear group,
the front group consisting of only a cemented lens and being movable along an optical axis of the zoom lens system for focusing on the object, wherein the zoom lens system further comprises an aperture stop, the aperture stop being movable together with the third lens group for zooming from the wide-angle end state to the telephoto end state, and
the following conditional expressions being satisfied:

$$1.20<f2/fw<1.90$$

$$-2.10<f3/fw<-0.80$$

where f2 denotes a focal length of the second lens group, f3 denotes a focal length of the third lens group, and fw denotes a focal length of the zoom lens system in the wide-angle end state.

20. A zoom lens system comprising, in order from an object side:
a first lens group having negative refractive power;
a second lens group having positive refractive power; and
a third lens group having negative refractive power,
a fourth lens group having positive refractive power,
each distance between adjacent lens groups being variable for zooming from a wide-angle end state to a telephoto end state,
the second lens group including, in order from the object side, a front group having positive refractive power, and a rear group,
the front group being movable along an optical axis of the zoom lens system for focusing on the object,
the first lens group being movable at first to an image side and then to the object side for zooming from the wide-angle end state to the telephoto end state,
the fourth lens group consisting of, in order from the image side, a cemented lens constructed by a negative lens cemented with a positive lens, and a single lens having positive refractive power, and the following conditional expressions being satisfied:

$$1.20<f2/fw<1.90$$

$$-2.10<f3/fw<-0.80$$

where f2 denotes a focal length of the second lens group, f3 denotes a focal length of the third lens group, and fw denotes a focal length of the zoom lens system in the wide-angle end state,
wherein upon zooming from the wide-angle end state to the telephoto end state, a distance between the second lens group and the third lens group increases, and a distance between the third lens group and the fourth lens group decreases.

21. A method for zooming a zoom lens system comprising steps of:
providing the zoom lens system comprising, in order from an object, a first lens group having negative refractive power, a second lens group having positive refractive power, a third lens group having negative refractive power, and a fourth lens group having positive refractive power, the second lens group including, in order from the object, a front group having positive refractive power and a rear group, the front group being moved along an optical axis of the zoom lens system upon focusing on the object, and the first lens group being moved at first to an image side and then to the object side for zooming from a wide-angle end state to a telephoto end state, the fourth lens group consisting of, in order from the image side, a cemented lens constructed by a negative lens cemented with a positive lens, and a single lens having positive refractive power, and the following conditional expressions being satisfied:

$$1.20 < f2/fw < 1.90$$

$$-2.10 < f3/fw < -0.80$$

where f2 denotes a focal length of the second lens group, f3 denotes a focal length of the third lens group, and fw denotes a focal length of the zoom lens system in the wide-angle end state; and
varying each distance between adjacent lens groups such that upon zooming from the wide-angle end state to the telephoto end state, a distance between the second lens group and the third lens group increases and a distance between the third lens group and the fourth lens group decreases.

22. A zoom lens system comprising, in order from an object side:
a first lens group having negative refractive power;
a second lens group having positive refractive power;
a third lens group having negative refractive power; and
a fourth lens group having positive refractive power,
each distance between adjacent lens groups being variable for zooming from a wide-angle end state to a telephoto end state,
the second lens group including, in order from the object side, a front group having positive refractive power, and a rear group,
the front group being movable along an optical axis of the zoom lens system for focusing on the object,
the third lens group including a cemented lens,
the fourth lens group consisting of, in order from an image side, a cemented lens constructed by a negative lens cemented with a positive lens, and a single lens having positive refractive power,
wherein upon zooming from the wide-angle end state to the telephoto end state, a distance between the second lens group and the third lens group increases and a distance between the third lens group and the fourth lens group decreases, and the following conditional expressions being satisfied:

$$1.20 < f2/fw < 1.90$$

$$-2.10 < f3/fw < -0.80$$

where f2 denotes a focal length of the second lens group, f3 denotes a focal length of the third lens group, and fw denotes a focal length of the zoom lens system in the wide-angle end state.

23. A zoom lens system comprising, in order from an object side:
a first lens group having negative refractive power;
a second lens group having positive refractive power;
a third lens group having negative refractive power; and
a fourth lens group having positive refractive power,
each distance between adjacent lens groups being variable for zooming from a wide-angle end state to a telephoto end state,
the second lens group including, in order from the object side, a front group having positive refractive power, and a rear group,
the front group being movable along an optical axis of the zoom lens system for focusing on the object,
the fourth lens group consisting of, in order from an image side, a cemented lens constructed by a negative lens cemented with a positive lens, and a single lens having positive refractive power,
wherein upon zooming from the wide-angle end state to the telephoto end state, a distance between the second lens group and the third lens group increases and a distance between the third lens group and the fourth lens group decreases,
wherein the zoom lens system further comprises an aperture stop, the aperture stop being movable together with the third lens group for zooming from the wide-angle end state to the telephoto end state, and the following conditional expressions being satisfied:

$$1.20 < f2/fw < 1.90$$

$$-2.10 < f3/fw < -0.80$$

where f2 denotes a focal length of the second lens group, f3 denotes a focal length of the third lens group, and fw denotes a focal length of the zoom lens system in the wide-angle end state.

* * * * *